US006249729B1

(12) United States Patent
Corrado et al.

(10) Patent No.: US 6,249,729 B1
(45) Date of Patent: Jun. 19, 2001

(54) KEEP OUT ZONE INCURSION FAST SENSING MODE FOR AIRBAG DEPLOYMENT SYSTEMS

(75) Inventors: Anthony P. Corrado, Clarkston; Ralf Seip, Oxford; Stephen W. Decker, Clarkston, all of MI (US)

(73) Assignee: Robert Bosch Corporation, Farmington Hills, MI (US)

( * ) Notice: Subject to any disclaimer, the term of this patent is extended or adjusted under 35 U.S.C. 154(b) by 0 days.

(21) Appl. No.: 08/957,730

(22) Filed: Oct. 24, 1997

(51) Int. Cl.$^7$ ................................................ B60R 21/32
(52) U.S. Cl. ............................ 701/45; 701/46; 701/300; 180/272
(58) Field of Search ..................... 701/45, 46, 93, 701/96, 98, 300; 180/271, 272, 273

(56) References Cited

U.S. PATENT DOCUMENTS 5,684,701 * 11/1997 Breed ..................................... 701/45
5,845,000 * 12/1998 Breed et al. ......................... 382/100

* cited by examiner

*Primary Examiner*—Tan Nguyen
(74) *Attorney, Agent, or Firm*—Jacques M. Dulin; Heller Ehrman White & McAuliffe

(57) ABSTRACT

An automotive occupancy sensing system and method for use in conjunction with airbag deployment systems, by which occupant nature, location and motion parameters within the vehicle interior are determined by ultrasound (US) and/or infared sensors. (IS). Criteria for airbag disablement or airbag modified/partial deployment are used to determine whether appropriate disablement or modified/partial deployment control signals are transmitted to the vehicle airbag deployment system. More particularly the system establishes a Keep Out Zone (KOZ) within the vehicle interior relative to the dashboard or instrument panel and determines actual or imminent incursions by occupants into the KOZ to produce a Keep Out Zone Incursion (KOZI) signal, and determines crash-imminent signal (CIS) criteria derived from one or more sensors within the vehicle. Both the KOZI and the CIS may be used to increase the rate of US pinging as well as to determine airbag disablement/modified deployment criteria.

3 Claims, 1 Drawing Sheet

KEEP OUT ZONE INCURSION FAST SENSING MODE FOR AIRBAG DEPLOYMENT SYSTEMS

CROSS REFERENCE TO RELATED APPLICATIONS

This application is a Regular Application based on Provisional Application Ser. No. 60/028,844, filed Oct. 23, 1996, entitled KEEP OUT ZONE INCURSION FAST SENSING MODE FOR AIRBAG DEPLOYMENT SYSTEMS, the benefit of the filing date of which is hereby claimed under 35 U.S.C. § 1.20.

TECHNICAL FIELD

The invention relates to automotive occupancy sensing (AOS) systems for sensing the nature or type of occupant and the location of the occupant with respect to the vehicle interior, and more particularly the occupant seat and dashboard or instrument panel (IP) to develop a signal useable by the airbag deployment system (ADS) by which the ADS can deploy or not (abort deployment), or modify deployment for dual phase airbags (DPA), multiphase (MPA), or for partial or controlled rate inflation airbags, collectively herein termed Smart Airbag Systems (SAS).

BACKGROUND OF THE INVENTION

For background on AOS systems see Corrado et aL, U.S. Pat. No. 5,482,314. Such systems produce a signal for input to the ADS, which if the occupant is out of position (OOP) or in a rear facing infant seat (RFIS) (in the front seat of a vehicle), the deployment of the airbag is aborted, deferred or otherwise controlled, as in SAS.

More recent studies have revealed that there is a class of slow speed automotive accidents causing injury to children, youngsters and frail adults. This usually occurs when the $\Delta V$ of the "crash" is 18 miles per hour or less, where the occupant is unbelted or in an RFIS and the driver jams on the brake. The airbag deployment sensor experiences a G-force great enough to signal deployment. Typically, in the low speed accident, the child has slid, or is sliding forward into the IP when the airbag deploys. The airbag deployment injures the child because it is too close, having intruded into the Keep Out Zone (KOZ).

DISCLOSURE OF THE INVENTION

The invention comprises a hierarchical discrimination system as a gateway to the probability analysis disclosed in our prior U.S. Pat. No. 5,482,314, and employs ultrasound sensing to determine the intrusion into a defined Keep Out Zone (KOZ) between the IP and the occupant seat. Typically, the zone is 6" to 12" deep (measured off of the face of the IP), and "intrusion" includes both actual presence in the zone or such approach to the zone that entry is predictably imminent. The disclosure of that patent (referred to above as U.S. Pat. No. 5,482,314) is hereby incorporated by reference to the extent needed, e.g., particularly for discussion of fuision algorithms, state determinations, probabilities, and the like.

According to the process and apparatus of the invention, the ultrasound (US) sensor cycles approximately 2x/second, or about 105 Hz (normal ping rate, NPR) in normal (non-crash) mode, and increases into a fast mode cycle rate, pinging on the order of every 10–20 milliseconds, i.e., 50–100 Hz rate, after receiving a "crash imminent" (CI) signal, or upon detection of a KOZ Intrusion condition or state (KOZI). The term "ping" is used hetein to mm the ecitation of the ultaound sensor to interogate the occupancy status of the vehicle by producing ultrasound echo signals as in above referenced U.S. Pat. No. 5,482,314. The "crash imminent" signal can be derived from a wide vaiety of sensors, such as but not limited to: the brake pedal being depressed upon a panic or abrupt stop for a road hazard or to avoid a collision; from the airbag deployment sensor; from the vehicle stabilizer control system (accelerometer and/or wheel and brake condition sensors); from a collision avoidance radar or other pre-crash sensing device; and/or from a variety of occupant sensors such as US, IR, optic, pressure or weight sensors (e.g., floor mat, seat or seat back, or seat belt), capacitance-type mass sensors, and the like.

Upon receipt of such CI or KOZI signal, the ultrasound ping rate goes into fast mode. Upon detection of an occupant in an inevitable or actual intrusion into the KOZ, the faision processing executive is bypassed and an output signal is sent to the airbag control system to immediately disable deployment of the airbag.

DETAILED DESCRIPTION OF THE BEST MODE FOR CARRYING OUT THE INVENTION

Figure 1:
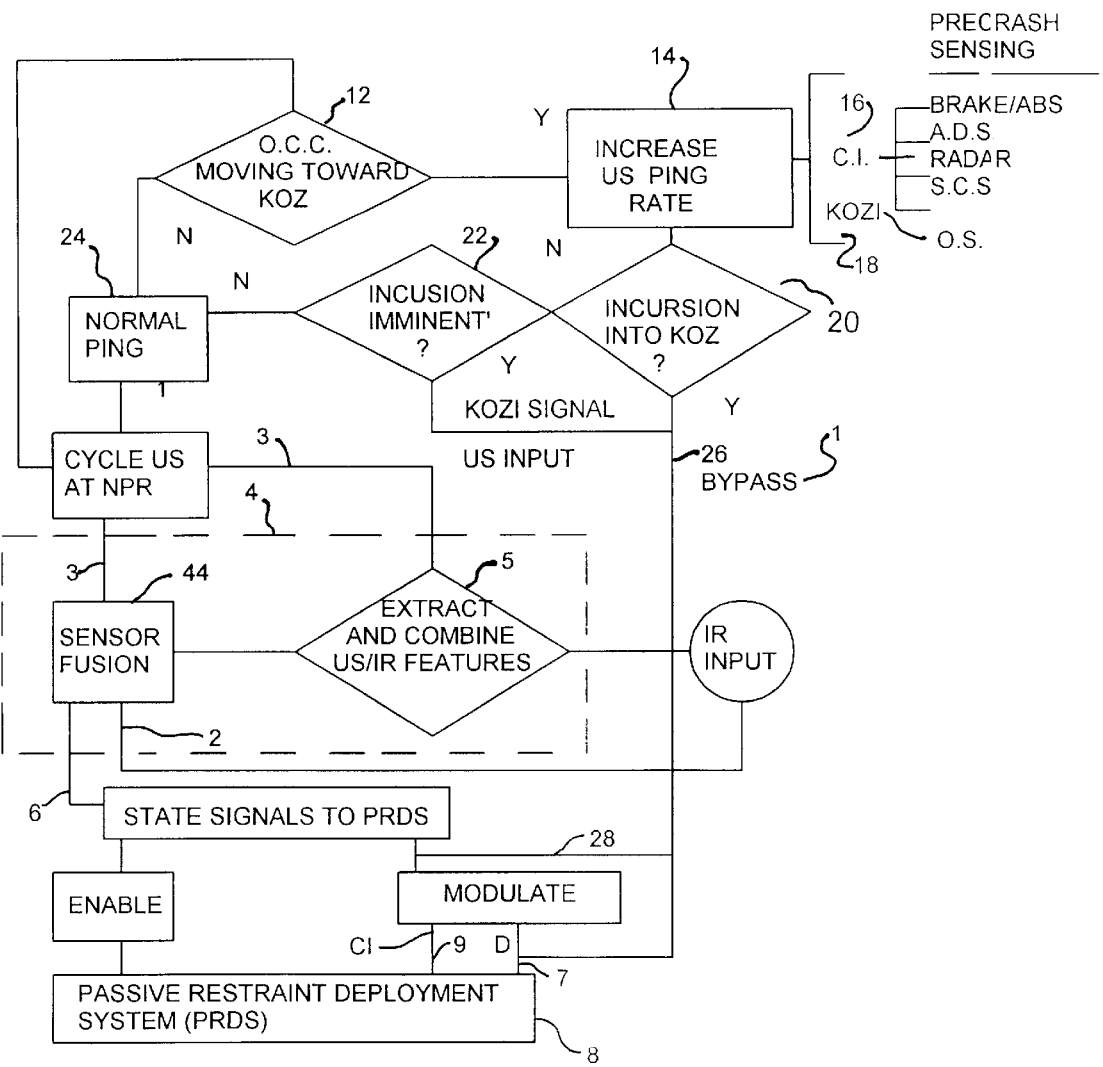
FIG. 1 is a schematic block diagram of the process of the invention.

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 illustrates the process of the invention 1. In the normal occupant sensing operation, the headliner direct infrared (IR) and ultrasound (US) sensors provide direct IR input 2 and US input 3 to the processor 4 which also combines IR and US inputs 5. The processor 4, by sensor fuision 44 (by algorithms such as described in aforesaid U.S. Pat. No. 5,482,314) evaluates signals, extracts signal features, combines selected signal features to obtain fiused features, associates the signal features and fused features with a predetermined, vehicle-specific set of confidence values and empirical relationships related to known occupancy scenarios, to determine a feature state value, and generates a state signal 6 depending on the occupancy state. The processor 4 may optionally include conventional neural network algorithms, such as are known in the art and available as conventional software. The signal can include generating an airbag deactivate signal 7 if the current state value is one of a subset of state values for which the passive restraint deployment system 8 is to be deactivated 7 or controlled 9, e.g., in a Smart Airbag System (SAS).

In the "normal" operating state, the U.S. is cycled to ping and receive at its normal ping rate (NPR) 10 at the rate of about 2x/sec. If, however, there is detected 12 by return signal amplitude and/or other feature that the occupant is moving toward the KOZ, then the ping cycle rate is increased 14 to every 10–20 milliseconds, or 50–100 Hz. Likewise, if a crash imminent or crash onset (CI) signal 16 is received from any pre-crash sensing device such as: brake pressure, brake travel, or ABS braling system intervention; airbag deployment control unit accelerometer sensors (ADS); collision radar; or vehicle stability control system; or if other occupant sensors (OS) derived KOZI signal(s) 18 is/are received, the ping rate 14 is likewise increased.

This fast Tate U.S. return signal is monitored for an actual 20 or imminent 22 incursion into the KOZ. This constitutes a Dynamic KOZ (DKOZ) sensing system. If there is none (N), then the system returns to normal ping rate 24. If, however, the KOZI analysis is yes (Y), then KOZI signal 26 is generated, bypassing the fuision processing 44 and its attendant state decision determination 6 as a disable signal 7 to the passive restraint system (PRDS) 8. The KOZI signal is a simple, discrete, amplitude level triggering signal hat is faster than a neural net.

It should be understood that the bypass KOZI signal 26 can be an input 28 to modulate the passive restraint deployment system (PRDS), e.g., in the case of a smart airbag system, where the airbag is dual or multi-phase (phased inflation), slow inflation, partial inflation, inflate/deflate or the like, such that a controlled inflation (CI) signal 9 triggers the PRDS to inflate in a predetermined controlled manner.

The Static KOZ (SKOZ) is a volume defined by a sensor which can detect the presence of an object within the defined volume. It has a preset effective field of view defined by the effective beam positioning. It operates as part of the overal algorithm and is based on the cycle rate of the system. Its output is a "disable" the airbag signal.

A Dynamic KOZ (DKOZ) mode is actuated whenever an external signal is present. This signal is typically a "pre-crash" signal from, e.g., the brake pedal, airbag crash electronic control unit, or other signal such as one derived from the antilock brake system (ABS). One of the US sensors is dedicated to "look at" the KOZ space. Upon receipt of an external signal, the normal AOS mode of operation is interrupted by a DKOZ service routine, which puts that US sensor in the fast ping mode as described above. A discrete amplitude-to-trigger level is chosen in order to minimize the time needed to finctionally output its disable signal. For example, selecting the sensor to generate an output signal within 30 msec of receipt of the modal change (change of state or receipt of a COI signal) and penetration (incursion) by any object into the KOZ.

The classification of occupancy state fimction is preferably a neural net (NN) discrete function with fuision table, or pure logically (empirically) derived, and essentially classifies the occupancy of a passenger seat in the volume unambiguously determined to be in the OZ (or "not KOZ"). The algorithm typically outputs the states of:

Occupant-adult like;
Occupant-other than adult like;
RFIS (Rear Facing Infant Seat); or
Empty It should be understood that there can be some tolerance in the dimensions selected for an algorithm to determine an output occupancy state. For example; the tolerance for the SKOZ is the delta radius from the sensor in the given range dimension. It can be determined either by sensor limitations (resolution or beam shape), or by performance requirements such as detection of "knees" or vehicle geometries, such as location of instrument panel (IP) and glove box door, The fuision algorithm incorporates a "sensor blocked" determination that can trigger a dash warning light or sound an alarm when sensors are blocked by an object, say a balloon, hat, hand, or some other physical object such as a plant placed on the seat or floor and extending up to the headliner. This can also result in no signal to the PRDS (airbag deployment system).

In operation, the received signals (US and IR) are processed as follows:

1. The status of SKOZ is determined by evaluating US signal features, e.g. as described in our aforesaid patent via a fision table or logically derived processing, such as comparison to stored known incursion and no-incursion events. The IR signal features are continuously processed to determine if an adult-like occupant is in the seat, and the fusion table weighted accordingly.

2. If there is no intrusion (detection of object) in the SKOZ then there is simultaneous or sequential determination of the occupancy classification in the OZ ("not KOZ") area. If the IR confinns the presence of an "adult like occupant" in OZ then the appropriate table for the DKOZ is selected. In addition, the fuision table selects a weighting schedule favoring "occupant". Where there is a situation in which neither SKOZ nor OZ is determined with high confidence, then the algorithm separates these two states further, e.g., by factoring in lack of an "adult like occupant" IR signature in one or both zones to select a weighting table favoring "no occupant".

3. When any CI signal is received, the system immediately changes to the fast ping DKOZ mode. The standard table is deselected, and the pre-selected table for the discrete sensor signal level is used to determine penetration and an output signal formed according to the condition determined. This DKOZ fast ping mode shall be maintained for a period of two seconds past the removal of the CI mode change triggering signal (return to normal, non-Cl, ping mode). See FIG. 1.

4. The IR signal features for motion are utilized to determine the conditions of intrusion and approximate size, this latter in combination with US range. Whenever the system has determined that a RFIS or "non-occupant" is present, the IR is utilized for determining intrusion from any direction. When intrusion is detected, the system locks in the RFIS or "non-occupant" state output until the intrusion is determined to have ceased.

5. If none of the above conditions are determined, then the algorithm analyzes features to determine if an empty state exists. Empty is defined as not having anything on the passenger seat. If this determination cannot be made with high confidence, then the AOS defaults in output to either enable or disable the airbag control system based on the best state determination possible.

6. In all cases the AOS unit communicates with the airbag electronic control unit in determination that a "crash" is occupying. This is preferably crash onset signal directly from the accelerometer output of the airbag electronic control unit, and not a "pre-crash" or "hard braking" signal.

But all three do trigger the DKOZ fast ping mode of operation as seen in FIG. 1. The last six seconds of AOS state determination is flashed to memory, whenever either the power is off or the crash onset signal has been received.

The increase in ping cycle rate and signal selection, e.g. amplitude implementation is conventional, given the description herein.

INDUSTRIAL APPLICABILITY

It is evident that the fast mode has wide applicability to detection of occupancy in a variety of commercially significant vehicles, in order to assist in deploying or not the airbag under various scenarios. Thus the methods and systems of the invention for example, can generate a signal that results in the airbag control system not deploying the airbag where it could injure a passenger, such as a rear facing infant seat, or someone too close to the instrument panel. The methods of the present invention improve accuracy of occupancy nature and position detection decisions, and permit a simple automotive occupancy system in which the KOZI signal can bypass the fuision processing and/or neural net of the AOS, permitting simple amplitude level triggering of a disable airbag deployment signal. The result is saved lives and reduced costs in not having to replace unnecessarily triggered airbags. The systems and methods of the invention can be applied to either IR or U.S. sensors, or both.

It should be understood that various modifications within the scope of this invention can be made by one of ordinary skill in the art without departing from the spirit thereof For example, continuous fast mode pinging can be employed all the time, or for selected vehicle operations, say when the vehicle reaches speeds of above about 65 mph (slower for a water-craft; faster for aircraft). We therefore wish this invention to be defined by the scope of the appended claims as broadly as the prior art will permit, and in view of the specification if need be.

What is claimed is:

1. A method of control of airbag deployment in an automotive vehicle interior to protect vehicle occupants event of an impact, said vehicle including an automotive occupancy sensor system for said vehicle interior which includes a Keep Out Zone, said automotive occupancy sensor system including signal processing to provide a processed signal to a passive restraint deployment system, said automotive occupancy sensor system has a plurality of sensors of which at least one of said sensors is an ultrasound sensor, said method comprising the steps of:

a) outputting from at least one of said sensors a signal indicative of imminent incursion of said Keeo Out Zone;

b) increasing the excitation rate of said ultrasound sensor:

c) determining from said imminent incursion signal that at least one of:
        i) said incursion is occuring;
        ii) said incursion will occur; and d) bypassing said automtive occupancy sensor system signal processing to send a disable signal to said passive restraint deployment system.

2. A method as in claim 1 in which said ultrasound sensor excitation is increased from a rate of about 2 times a second to a rate of about 50 to 100 times per second.

3. A method as in claim 2 wherein said signal processing includes fuision processing.

\* \* \* \* \*

UNITED STATES PATENT AND TRADEMARK OFFICE
CERTIFICATE OF CORRECTION

PATENT NO.   : 6,249,729 B1  
DATED        : June 19, 2001  
INVENTOR(S)  : Anthony P. Corrado Page 1 of 1

It is certified that error appears in the above-identified patent and that said Letters Patent is hereby corrected as shown below:

Title page,
Item [75], Inventors, should read:
-- Anthony P. Corrado, Evergreen CO (US) --

Signed and Sealed this

Fifth Day of March, 2002

*Attest:*

JAMES E. ROGAN  
*Director of the United States Patent and Trademark Office*

*Attesting Officer*